United States Patent [19]
Ammon et al.

[11] 4,425,733
[45] Jan. 17, 1984

[54] FLY PAPER

[75] Inventors: Helmut K. Ammon; John G. Updike, both of Waiblingen, Fed. Rep. of Germany

[73] Assignee: FR. Kaiser GmbH, Waiblingen, Fed. Rep. of Germany

[21] Appl. No.: 318,455

[22] Filed: Nov. 5, 1981

[30] Foreign Application Priority Data

Jul. 9, 1981 [DE] Fed. Rep. of Germany ....... 3127125

[51] Int. Cl.³ .............................................. A01M 1/14
[52] U.S. Cl. ......................................... 43/115; 43/114
[58] Field of Search ................... 162/107; 43/114, 115, 43/116, 136

[56] References Cited

U.S. PATENT DOCUMENTS

| 988,003 | 3/1911 | Lord | 43/114 |
| 1,117,284 | 11/1914 | Wagner | 43/116 |
| 1,242,648 | 10/1917 | Braedt | 43/114 |
| 2,653,090 | 9/1953 | Crandall | 162/107 |

FOREIGN PATENT DOCUMENTS

| 799545 | 1/1936 | France | 43/114 |
| 497059 | 12/1938 | United Kingdom | 162/107 |

Primary Examiner—Nicholas P. Godici
Assistant Examiner—Kurt Rowan

[57] ABSTRACT

An improved fly paper comprising a strip coated with sticky material and which, for increasing the possible size of the strip, is made of foil or paper reinforced by high tensile threads. The strip is folded about a line located generally halfway between its ends and rolled up, while folded double; the roll being covered by the two ends of the strip which are uncoated. The strip ends are provided with eyes for hanging up the strip on use.

6 Claims, 8 Drawing Figures

FLY PAPER

BACKGROUND OF THE INVENTION

The present invention relates to a fly paper comprising a strip coated with sticky material done up in a roll to be packed in a tube or box for purpose of transport and sale.

In the past, rolled fly papers have been used for hanging in rooms from the ceiling. These types of papers are provided with a non-poisonous sticky coating which normally includes a substance which attracts flies, and, on landing on the coating, the flies become glued to the paper.

Rolled fly papers of the prior art are generally sold in the form of somewhat narrow strip of only about 1 meter in length, this being a shortcoming since a large number of these strips must be attached to and hung vertically from the ceiling of a large room, as for example in farm buildings in order to substancially reduce the fly population. Obviously, attaching numerous strips to the ceiling is troublesome and time consuming, and hanging vertically from the ceiling the possible length of the strips is limited.

SUMMARY OF THE INVENTION

Accordingly, the object of the present invention is to provide a fly paper strip which may be used in the place of a large number of prior art fly paper strips and which is more easily hung than present-day fly papers.

For effecting the above objects, the paper of the present invention is of greater length than the paper strips of the prior art but nevertheless may be simply handled and readily fixed in horizontal position from a ceiling.

The present invention is characterized in that:
(a) the strip is made of a material which for a given thickness has a higher tensile strength than paper,
(b) the strip is folded in half and rolled up about the fold between its ends, the ends being next to each other,
(c) the two ends are free of sticky coating,
(d) the two ends are turned over and folded at least double for fixing to supports for hanging the strip, and
(e) the outermost turn of the strip is free of coating.

Because the strip is stronger than paper for a given thickness, it may be much larger in size, that is to say in area, while still being able to withstand the pulling force needed for unrolling the strip in view of the sticking nature of the coating. Moreover, the strip will also be capable of withstanding the force needed for keeping the strip fixed to the ceiling.

As stated above, the strip is folded in half resulting in the two ends of the strip being located on the outer side of the roll. For this reason, the rolled strip may be taken out bodily from a box and one end fixed to the ceiling or the like by nailing, tying or other means, and then, by pulling on the other end of the strip, the roll may be unrolled, and likewise affixed to the ceiling.

As noted in part (c) above, the two ends of the strip are free of coating, and therefore there is no danger of the user getting sticky coating on his hands when handling the strip. In addition, since the strip has reinforced end edges, a strong section is provided for joining the strip with nails, tying, or the like to the ceiling and therefore loads at the ends of the strip do not have the effect of limiting the possible size of the strip.

Lastly, due to the fact that in the rolled condition the outer surface of the strip is free of sticky coating, it may be packed in a box and taken therefrom by hand without the strip roll sticking in the box or to adjacent rolls.

The strip may be made by weaving, knitting or any other means by which threads are joined together so as to produce the desired tensile strength.

As would be understood by one skilled in the art, the strip may be coated with the sticky material by any conventional means, for example, by dipping. In this manner the sticky substance is coated on and absorbed between the separate threads of the strip.

In another embodiment of the present invention the strip may be foil which, for a given thickness, has a higher tensile strength than paper. If the foil has a smooth surface such that the sticky material does not sufficiently adhere, the surface may be roughened or dented.

The strip may be made of strong threads of any desired sort, for example in the form of metal wires and/or synthetic resin foil reinforced thereby. Preferably, the strip is made of paper which is reinforced by fiberglass threads.

In the case of a further preferred example of the strip of the present invention, the reinforced end edges of the strip are formed by zig-zag foldings of its ends, and at each end one corner of the reinforced material is turned over and folded down so that an eye may be fixed through it for hanging up the strip.

The strip produced on these lines may have a breadth of at least 10 cm and, preferably, about 20 cm while the length may be at least 120 cm and, preferably, 220 cm. However, the strip may be made very much broader and longer than this.

DESCRIPTION OF THE PREFERRED EMBODIMENT

Figure 1:
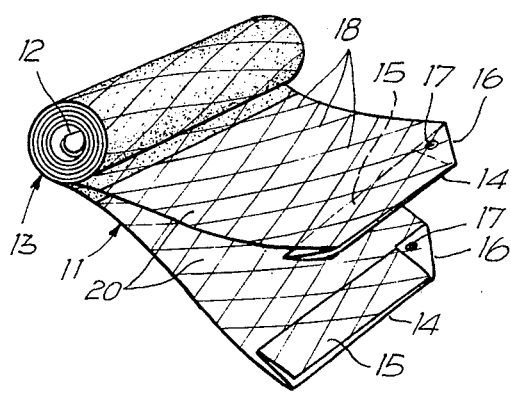
FIG. 1 is a perspective view of a preferred embodiment of the present invention depicting the strip folded along a fold line located between its ends and then rolled up about the fold.

The apparatus of the present invention comprises a fly catching strip 11, which is folded along fold 12 located generally halfway between its ends and is rolled to form roll 13 shown in FIG. 1, the two edges 14 of the strip 11 being aligned with each other on the roll. At its end portions strip 11 is provided with end margins 15 which are formed by double zig-zag folding of the strip ends so that, in all, three layers are formed. One corner of each end margin 15 is turned down about an angle fold 16 and then an eye 17 is run through it and fixed tightly in position, such eye 17 being used for fixing the strip in position to a ceiling. Because the eye goes through all six layers of the strip, it results in a strong bond with the rest of the strip so that no tearing of the strip near the eye 17 will result.

Strip 11 is made of paper which is reinforced by a network of high tensile fiberglass threads 18 embedded in the paper. The two sides of the strip 11 are coated with a non-poisonous sticky material to which the flies become glued when the strip is used. In this respect, the reinforced end margins 15 and the strip parts 20 next thereto, which are not coated are of such length that they completely cover the outside portion of the roll. Therefore, in the rolled up condition, the outer, uncoated end of the strip forms a casing for the roll 13 so that the roll will not be glued in its box nor will the sticky material come in contact with the hands of the user.

Figure 2:
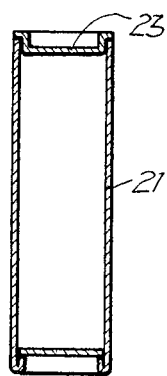
FIGS. 2 and 3 are axial sections of two different round boxes for the strip roll shown in FIG. 1.
Figure 3:
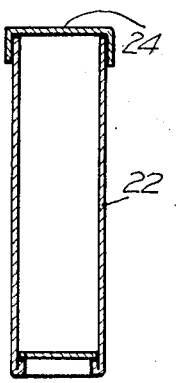
Figure 4:
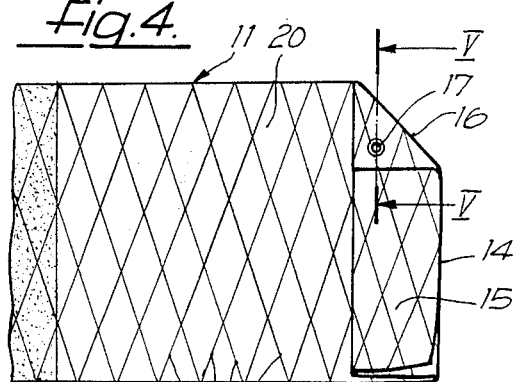
FIG. 4 is a plan view of one end of the strip.
Figure 5:
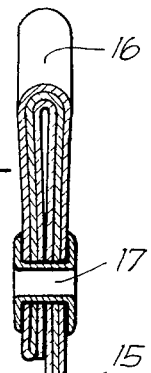
FIG. 5 is a section on the line V—V of FIG. 4 on a greater scale.

FIGS. 2 and 3 are views of two working examples of round boxes 21 and 22 for the rolled-up strip roll 13. Box 21 has a cover 23, adapted to be pushed into its top end while the cover 24 of box 22 is pushed thereonto.

Figure 6:
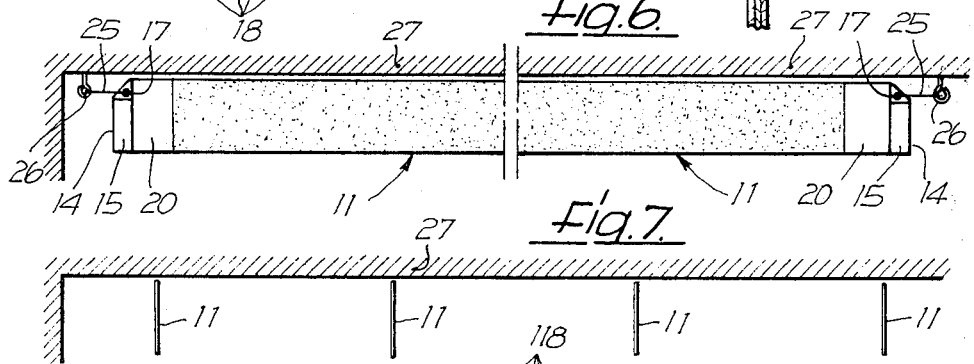
FIGS. 6 and 7 are two sections, normal to each other, of the line-up of fly paper strip under the ceiling of a room, the section of FIG. 6 not giving the full length of a strip.
Figure 7:
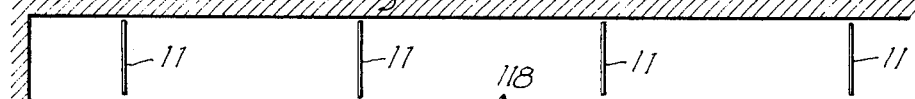

In use cord 25 is threaded through the eye 17 at one end of the strip, and then fixed to a hook 26 (see FIG. 6) hammered or screwed into a ceiling 27 as for example the ceiling or roof of a building for livestock. An additional piece of cord 25 is threaded through the eye 17 of the other end of the strip and fixed at the necessary distance to the ceiling or roof 17 using hook 26. Because the strip 11 is reinforced by high tensile fiberglass. Threads and the eyes 17 are fixed in the sixfold thickness at the end margin 15, it is possible for the strip to have a much greater area than that of presently marketed fly papers. In the present example the breadth of the strip is 20 cm and its length is 220 cm. However, strips having a breadth of 10 cm and a length of 120 cm also produce satisfactory results.

Figure 8:
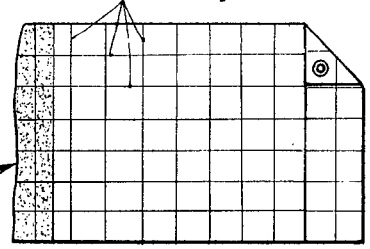
FIG. 8 is a view, on the same lines as FIG. 4, of the end strip with a different form of reinforcement using high tensile threads.

In the case of the strip depicted in FIGS. 1 to 6, bias reinforcement threads 18 are used. FIG. 8 is a view of a further example of the strip of the present invention in which the tensile threads 18 are placed parallel to and normal to the length of the strip.

A further embodiment of the strip of the present invention is the use of a foil-like material, for example, synthetic resin or the like reinforced with high tensile strength threads, as for example, wires. The strip may, however, be made up of threads which are joined together, for example by weaving or knitting or may be made of a synthetic resin foil without any reinforcement threads, so long as such foil has the necessary tensile strength in itself.

The box for the roll 13 of strip 11 may furthermore be made in the form of a narrow box having a square cross-section and which may be shut by a cover running along its length.

What is claimed is:

1. An improved fly paper comprising a strip of material having theron a sticky coating with two end portions being free of said coating, the strip being folded along a fold midway between said end portions with said end portions being adjacent each other and wrapped around said fold to form a roll, wherein:
   (a) the strip is made up of a material which, for a given thickness has a higher tensile strength than paper;
   (b) the end margin portions of said two end portions are reinforced by folding said end margin portions zig-zag, and one corner of each of said reinforced end margin portions being turned over and folded down and an eye placed therethrough for hanging said strip; and
   (c) at least one of said coating free end portions of said strip forming the outermost turn of the strip on the roll, thereby forming a cover stretching around the roll for at least one full turn.

2. An apparatus as claimed in claim 1, wherein in the rolled condition, the two end edges of the strip are generally aligned with each other and the length of said coating free end portions of said strip are such that they are adapted to wrap around the roll for at least one turn thereby covering it.

3. An apparatus as claimed in claim 1, wherein the strip is made up of threads which are joined together.

4. An apparatus as claimed in claim 1, wherein the strip is made of paper having fiberglass threads embedded therein.

5. An apparatus as claimed in claim 1, wherein the strip has a length of at least 120 cm and a width of at least 10 cm.

6. An apparatus as claimed in claim 1, wherein the strip has a length of at least 220 cm and a width of at least 20 cm.

* * * * *